United States Patent [19]

Palermo et al.

[11] 4,365,723
[45] Dec. 28, 1982

[54] PEDESTAL HOUSING FOR CABLE TELEVISION COMPONENTS

[76] Inventors: Michael A. Palermo, 1165 S. Beecham Rd.; James L. Mason, 1169 S. Beecham Rd., both of Williamstown, N.J. 08094

[21] Appl. No.: 286,098

[22] Filed: Jul. 22, 1981

[51] Int. Cl.³ .......................... H02G 3/08; B65D 6/00
[52] U.S. Cl. ...................................... 220/3.8; 220/210
[58] Field of Search ..................... 220/3.8, 4 R, 210; 174/66, 67

[56] References Cited

U.S. PATENT DOCUMENTS

| | | | |
|---|---|---|---|
| 2,804,986 | 9/1957 | Jeffers et al. | 220/3.8 X |
| 3,315,023 | 4/1967 | Davis | 220/3.8 X |
| 3,734,335 | 5/1973 | Lincoln | 220/4 R |
| 4,122,972 | 10/1978 | Bozich | 220/3.8 X |
| 4,129,743 | 12/1978 | Lohsl | 220/3.8 X |

*Primary Examiner*—George T. Hall
*Attorney, Agent, or Firm*—Duffield & Lehrer

[57] ABSTRACT

A substantially rectangularly shaped metal housing includes a rear wall, a pair of side walls, a top wall and a lower partial front wall; the upper portion of the front of the housing being open. The top wall being larger than the base of the housing and extending forwardly and downwardly over the front thereof. A cover for the open front fits up under the top wall and includes a rearwardly and downwardly extending flange which rests on the top edge of the partial front wall to support the cover in place. A locking member prevents unauthorized removal of the cover.

3 Claims, 3 Drawing Figures

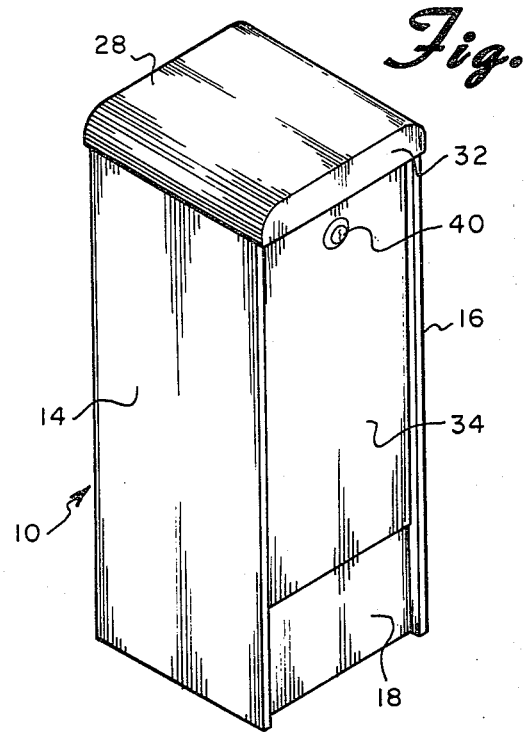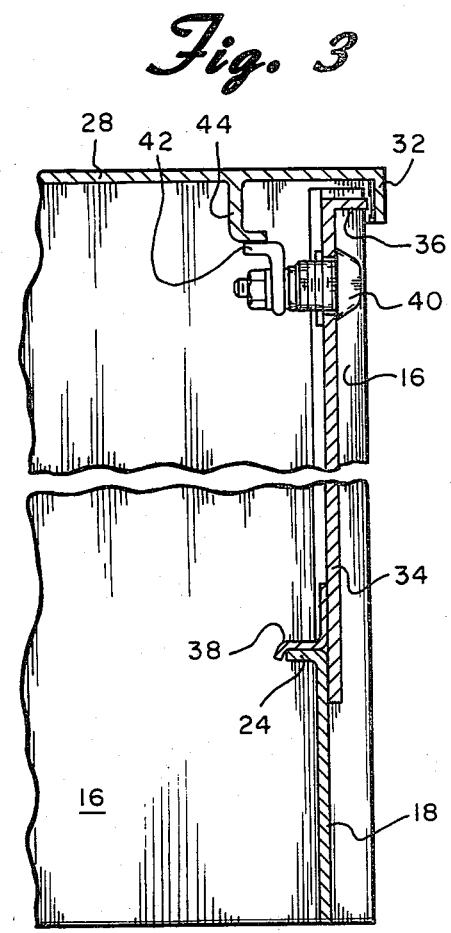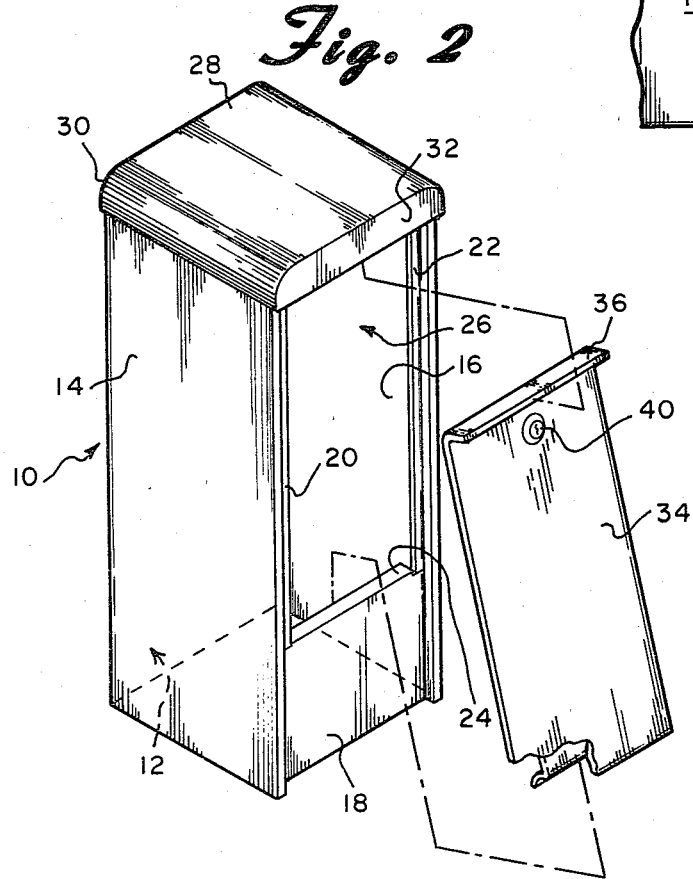

PEDESTAL HOUSING FOR CABLE TELEVISION COMPONENTS

BACKGROUND OF THE INVENTION

The present invention is directed toward a pedestal housing for cable television components and more particularly toward such a housing which is substantially weatherproof but which includes a door that can be easily opened by authorized personnel when it is desired to service the components therein.

Pedestal housings of the class to which the present invention belongs have been known and used for many years. These are normally used out-of-doors and are mounted at ground level to house underground telephone connections. More recently, such devices have been used for underground cable connections and related components for cable television.

All prior housings (often referred to as closures) known to Applicants are either constructed in multiple parts which must be disassembled when a technician or other authorized person wishes to work on the components within the housing or they include a hinged door which may be opened. In the former case, disassembly of the housing increases the amount of time that the technician must spend and carries with it the possibility that parts such as screws or the like holding the housing together may be lost. The use of a hinged door makes it extremely difficult to weatherproof the housing, particularly at the top thereof. Furthermore, if snow has piled up around the housing, it may be extremely difficult to open the hinged door.

SUMMARY OF THE INVENTION

The present invention is believed to overcome the deficiency of the prior art discussed above. This is accomplished by providing a substantially rectangularly shaped metal housing including a rear wall, a pair of side walls, a top wall and a lower partial front wall; the upper portion of the front of the housing being open. The top wall is larger than the base of the housing and extends forwardly and downwardly over the front thereof and serves to prevent rain and other precipitation from entering the front of the housing. A cover for the open front fits up under the top wall and includes a rearwardly and downwardly extending flange which rests on the top edge of the partial front wall to support the cover in place. A locking member prevents unauthorized removal of the cover by preventing the cover from moving upwardly to release the flange.

BRIEF DESCRIPTION OF THE DRAWINGS

For the purpose of illustrating the invention, there is shown in the accompanying drawing one form which is presently preferred; it being understood that the invention is not intended to be limited to the precise arrangements and instrumentalities shown.

FIG. 1 is a front perspective view of a pedestal housing for cable television components constructed in accordance with the principles of the present invention;

FIG. 2 is a perspective view similar to FIG. 1 but showing the manner in which the front cover interfits with the remaining parts of the housing, and FIG. 3 is a partial cross-sectional view through the line 3—3 of FIG. 1.

DETAILED DESCRIPTION OF THE PREFERRED EMBODIMENT

Referring now to the drawing in detail wherein like reference numerals have been used throughout the various figures to designate like elements, there is shown in FIGS. 1 and 2 a pedestal housing for cable television components constructed in accordance with the principles of the present invention and designated generally as 10. FIG. 1 shows the housing with the cover in place and FIG. 2 shows the same with the cover removed so that a technician or other authorized person can gain access to the interior of the housing.

Housing 10 includes a substantially rectangularly shaped and vertically extending rear wall 12. A pair of side walls 14 and 16 are rigidly connected to the rear wall 12 and extend forwardly toward the front of the housing. A partial front wall 18 extends between and is rigidly connected to the forward lower portions of the side walls 14 and 16. Additional partial front walls 20 and 22 in the form of elongated metal strips or the like are rigidly secured to the forward ends of the side walls 14 and 16, respectively, and extend upwardly from the partial lower front wall 18.

As can best be seen from FIG. 2, the partial front wall 18 preferably extends upwardly from the bottom of the housing only about one-fourth of the entire height of the same and terminates in a small turned in upper edge 24. While the precise height of the wall 18 is not critical to the present invention, it is important that a relatively large opening 26 remain in the front of the housing.

A top wall 28 is secured to the rear wall 12 and the side walls 14 and 16 and preferably includes rounded corners such as shown at 30. While the edges of the top wall 28 may be substantially coextensive with the rear wall 12 and the side walls 14 and 16, the front of the top wall 28, however, extends forwardly of the partial front wall 18 and terminates in a downwardly extending portion 32 all of which is best shown in FIG. 3. It should further be noted that the forward edges of the side walls 14 and 16 extend forwardly of the partial front wall. This feature and the fact that the roof or top wall 28 extends forwardly of the front wall 18 help to prevent precipitation from entering the interior of the housing 10 through the opening 26 as will become more apparent hereinafter.

A substantially rectangularly shaped cover member 34 is also provided for covering the opening 26. The overall dimensions of the cover member 34 are slightly larger than the opening 26 so that when the same is in place as shown in FIG. 3, the cover member overlaps the upper portion of the lower partial front wall 18 and the two additional partial front walls 20 and 22. As can also be seen from FIG. 3, the uppermost portion of the cover member 34 which is bent forwardly to form a flange 36 fits within the overhang of the top wall 28 when the cover member is in place. Extending rearwardly and downwardly from the lower portion of the back of the cover member is a flange 38 which is securely fixed to the cover member 34.

The cover member 34 is moved into place in the following manner. The upper portion is first rested against the additional partial front walls 20 and 22 and the cover member is slid upwardly until the uppermost portion 36 fits into the overhang at the forward end of the roof or top wall 28 and is continued to be moved upwardly until it strikes the inner surface of the top wall 28. At that point, the lower end of the cover member 34 is moved inwardly so that the flange 38 moves over the top of the top edge 24 of the front wall 18. The cover member 34 is then allowed to drop slightly so that the flange 38 hangs over the back of the top edge 24 of the wall 18 and supports the weight of the cover member 34. In this position, as shown in FIG. 3, the lower part of the cover member 34 will not move outwardly because of the interaction between the flange 38 and the ledge 24. The upper portion of the cover member 34 cannot move forwardly since the turned out upper edge portion 36 thereof will engage the downwardly extending portion 32 of the top wall 28. The cover member 34 is, of course, removed by reversing the foregoing procedure.

A locking mechanism is also provided for preventing the unauthorized removal of the cover member 34. The locking mechanism is comprised of a key operated lock 40 mounted centrally of the cover member 34 adjacent the upper edge thereof. When a key is inserted into the lock 40 and turned, the latch 42 may be rotated between the upper operative position (shown in FIG. 3) and a lower inoperative position. In the locked, operative position shown in FIG. 3, the top of the latch engages the lower surface of a flange 44 which extends downwardly from the inner surface of the top wall 28. This interaction between the latch 42 and the flange 44 prevents the cover member 34 from being moved upwardly. Since the cover member 34 cannot be moved upwardly, the flange 38 remains engaged with the ledge 24 of the front wall 18 and thus the cover member 34 is secured in place. It should be readily apparent that by turning the latch 42 into its lower inoperative position (not shown) the cover member may be raised by placing one's fingers under the turned out portion 36 and the cover member removed in the manner described above.

From the foregoing, it should also be readily apparent that when the cover member 34 is in place over the opening 26, rain or other precipitation cannot enter the opening 26 to reach the interior of the housing. The forward and downwardly extending portion 32 of the top wall 28 prevents falling rain from entering through the top of the opening. Furthermore, in the event that the rain has a horizontal component of velocity which may be caused by driving wind or the like, the forward edges of the side walls 14 and 16 and the additional partial front walls 20 and 22 will prevent this rain or other precipitation from entering the housing.

The present invention may be embodied in other specific forms without departing from the spirit or essential attributes thereof and accordingly, reference should be made to the appended claims rather than to the foregoing specification as indicating the scope of the invention.

We claim:

1. A substantially rectangularly shaped housing for cable television components comprising;

a rear wall, a pair of side walls, a top wall and a lower partial front wall, all of said walls being rigidly secured together;

the front of said housing having an opening therein above said partial front wall;

said top wall extending forwardly of said housing and overlying said opening, said partial front wall and the forward edges of each of said side walls, the front end of said top extending downwardly;

a cover member having a size slightly larger than said opening and being adapted to cover and close the same;

said cover member including a rearwardly and downwardly extending flange secured to the lower portion of the back thereof, said flange being adapted to fit over and behind the upper edge of said partial front wall after the uppermost portion of said cover member is positioned within the forward extension of said top wall, and locking means for preventing the unauthorized removal of said cover member.

2. The housing as claimed in claim 1 wherein said locking means includes means for preventing upward movement of said cover member.

3. The housing as claimed in claim 1 wherein the forward edges of said side walls extend forwardly of said partial front wall and said cover member when said cover member is in place over said opening.

* * * * *